Patented Sept. 12, 1950

2,521,754

UNITED STATES PATENT OFFICE 2,521,754

PEROXY POLYMERIZATION OF VINYL AROMATIC COMPOUNDS

Tevis Shusman, Longmeadow, Mass., assignor to Monsanto Chemical Company, St. Louis, Mo., a corporation of Delaware No Drawing. Application May 7, 1948, Serial No. 25,801

6 Claims. (Cl. 260—93.5)

This invention relates to the polymerization of materials containing vinyl aromatic compounds.

Various processes have been suggested for carrying out the polymerization of vinyl aromatic compounds such as styrene. Usually these processes include the use of a catalyst, particularly, a peroxide catalyst. Among the catalysts which have been suggested is ditertiary butyl peroxide. While the use of this catalyst is advantageous in accelerating the polymerization in its final stage, i. e. beyond 90–95% conversion, it is relatively ineffective in the earlier stages of the polymerization. Furthermore, the use of this catalyst tends to produce polymers of reduced molecular weight.

It is an object of this invention to provide a new process for polymerizing materials containing vinyl aromatic compounds.

Another object of this invention is to provide a rapid polymerization process for vinyl aromatic compounds.

A further object is to provide a polymerization process for preparing improved polymers of vinyl aromatic compounds.

These and other objects are accomplished according to this invention by polymerizing materials containing vinyl aromatic compounds in the presence of ditertiary butyl peroxide and tertiary butyl perbenzoate. Surprisingly, the use of both ditertiary butyl peroxide and tertiary butyl perbenzoate leads to unexpected advantages both as regards reduction in length of the polymerization cycle and as regards the physical characteristics of the polymerization products.

Hereinafter, ditertiary butyl peroxide will be designated at DTBP and tertiary butyl perbenzoate will be designated as PB.

The following examples are illustrative of the present invention but are not to be construed as limitative thereof. Where parts are mentioned, they are parts by weight.

The procedure used in the examples in Table I is to place a mixture of styrene and the catalyst or catalysts, as the case may be, in a suitable vessel and to heat the vessel and its contents at a temperature of 90° C. until 28% of the styrene has polymerized and then raise the temperature at a substantially uniform rate to 192° C. over a period of 12 hours. Thereafter, the temperature is allowed to drop to 163° C. over a period of 3 hours and finally gradually raised to 177° C. over a period of 1 hour.

In Table I, the amounts of catalyst are based on 100 parts of styrene.

TABLE I

| Example | I | II | III | IV | V | VI | VII | VIII |
|---|---|---|---|---|---|---|---|---|
| Catalyst (Parts): | | | | | | | | |
| DTBP | 0.02 | 0.05 | 0.02 | 0.02 | 0.02 | 0.02 | 0.02 | |
| PB | | | 0.005 | 0.01 | 0.02 | 0.03 | 0.05 | 0.02 |
| Time to Polymerize 28% of Styrene (Hours) | 23 | 22 | 18.5 | 17.3 | 16.3 | 14.8 | 13.3 | 17.5 |
| Total Polymerization Time (Hours) | 39 | 38 | 34.5 | 33.3 | 32.3 | 30.8 | 29.3 | 33.5 |
| Molecular Weight of Polymer Product (Thousands) | 69 | 67 | 82 | 82 | 83.5 | 82 | 82.5 | 89 |
| Methanol Soluble Content of Polymer Product (per cent) | 1.6 | 1.5 | 1.6 | 1.6 | 1.6 | 1.6 | 1.6 | 3.0 |

The procedure used in the examples in Table II is to mix styrene and the catalyst or catalysts, as the case may be, and place the mixture in a suitable vessel. The vessel and its contents are then heated at 90° C. until 28% of the styrene has polymerized, followed by raising the temperature to 135° C. over a period of 5 hours and finally heating at 180° C. for 3 hours.

In Table II, the amounts of catalyst are based on 100 parts of styrene.

The physical test results set forth in Table II were made according to the following A. S. T. M. test methods: (flexural strength and deflection) D650–42T, (tensile strength and elongation) D638–42T, (impact strength) D256–43T (except that unnotched specimens are used).

TABLE II

| Example | IX | X | XI | XII |
|---|---|---|---|---|
| Catalyst (Parts): | | | | |
| DTBP | 0.02 | 0.02 | | |
| PB | | 0.02 | 0.02 | 0.03 |
| Total Polymerization Time (hours) | 31 | 23.8 | 23.3 | 22.3 |
| Molecular weight of Polymer Product | 63,000 | 69,000 | 68,700 | 71,300 |
| Flexural Strength (Pounds/Square Inch) | 11,400 | 14,500 | 13,200 | 13,000 |
| Methanol Soluble Content of Product (%) | 5.0 | 1.8 | 4.3 | 4.3 |
| Deflection (Inches) | 0.15 | 2.7 | 0.19 | 0.19 |
| Tensile Strength (Pounds per Square Inch) | 7,000 | 8,500 | 7,300 | 7,400 |
| Elongation (%) | 1.8 | 2.5 | 2.0 | 1.9 |
| Impact Strength (Unnotched) (Foot Pounds/Inch Width) | 2.9 | 5.7 | 4.0 | 4.4 |

Example XIII

There are dissolved in 100 parts of monomeric styrene 0.005 part of DTBP and 0.005 part of PB. The resulting solution is placed in a suitable vessel and the vessel and its contents are heated at 125° C. until the methanol-soluble content of the polymer is reduced to less than 3%. The time required to achieve this extent of polymerization is substantially less than if 0.01 part of either DTBP or PB is used as the catalyst.

*Example XIV*

Example XIII is repeated except that 0.1 part of DTBP and 0.1 part of PB is used as the catalyst and the polymerization is carried out at 90° C. The time required to reduce the methanol-soluble content to less than 3% is substantially less than when 0.2 part of either DTBP or PB is used as the catalyst. In particular, the reaction is far easier to control when large masses are polymerized than when 0.2 part of PB is used as the catalyst.

*Example XV*

Example XIII is repeated except that the catalyst is a mixture of 0.0095 part of DTBP and 0.0005 part of PB. The polymerization time is shorter than when the catalyst is 0.01 part of either DTBP or PB.

Similar results are obtained when the catalyst is a mixture of 0.0005 part of DTBP and 0.0095 part of PB.

*Example XVI*

Example V is repeated except that a mixture of 50 parts of styrene and 50 parts of para chloro styrene is used in place of 100 parts of styrene. Substantial improvement is noted in the rate of polymerization to a methanol-soluble content of less than 3% as compared with the use of 0.04 part of either DTBP or PB alone as the catalyst. Also far easier control of the reaction is obtained than when 0.04 part of PB is used as the catalyst.

*Example XVII*

Example XVI is repeated except that a mixture of 50 parts of styrene and 50 parts of vinyl chloride is polymerized in an autoclave. Similar improvement is obtained as compared with the use of either catalyst alone.

As can be seen by consideration of the results set forth in the examples, the process of the invention leads to highly advantageous and unobvious results. Thus, in contrast to polymerization processes using DTBP as the sole catalyst, the process of the invention requires a significantly shorter time to achieve the same extent of polymerization as reflected by the methanol-soluble content of the polymer product. Furthermore, the polymers made by the present process have appreciably higher average molecular weights and possess significantly improved physical characteristics despite the shorter polymerization cycle. Thus, as shown by examples in Table II, the products of the process of the invention are greatly superior as regards flexural strength, deflection, tensile strength, elongation and impact strength. These improved results are accomplished without sacrifice as regards clarity, color and molding characteristics.

It is also to be noted that the improved results of the invention are not attained by simply increasing the amount of DTBP.

In further contrast to the process of the invention, the improved results which are achieved by this process are not achieved by the use of PB alone. While this catalyst causes a rapid reaction initially, it is difficult to reduce the methanol-soluble content of the product to the desired extent, i. e., less than 3%. Attempts to overcome this defect by simply increasing the amount of PB leads to other undesirable results, in particular, a difficultly controllable polymerization reaction. Furthermore, the process of the invention leads to polymer products having improved physical characteristics as can be seen by comparing the results in Example X with those in Examples XI and XII.

The process of the invention as illustrated by the examples is not limited to the specific polymerization conditions set forth therein. For reasons of economy and to achieve specific polymer characteristics, it is desirable to carry out the polymerization at elevated temperatures, i. e., at least 40–50° C. but not above the temperature at which the polymer decomposes. Usually temperatures in the range of 75–200° C. are employed.

Various temperature cycles may be used without departing from the essence of the invention. For example, instead of polymerizing under varying temperature conditions, a uniform temperature may be used, e. g., 90° C., 100° C., 125° C., etc. Also, polymerization cycles using varying temperatures other than those set forth in the specific examples may be used to achieve specific results. Regardless of the temperatures used, the process of the invention is found to yield superior results.

The amount of catalyst which is used is governed by such factors as the nature of the polymerizable material, the temperatures employed and other reaction conditions as well as the particular characteristics desired in the polymer. Usually 0.001%–1% and preferably 0.01–0.1% catalyst is used, based on the amount of polymerizable material. However, other amounts may be found desirable for certain purposes. Generally, not over 95% and preferably not over 75% of the catalyst is made up of either DTBP or PB.

Advantages residing in the use of the process of the invention apply not only to the polymerization of styrene but also to the polymerization of other vinyl aromatic materials, mixtures of vinyl aromatic compounds or mixtures of vinyl aromatic compounds with substances copolymerizable therewith containing ethylenic double bonds. Particularly preferred copolymerizable materials are substances containing a vinylidene

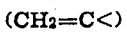

$(CH_2=C<)$ or vinyl

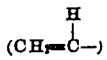

$(CH=C-)$
         $|$
         $H$ group. As examples of vinyl aromatic materials may be mentioned para-methyl-styrene, meta-ethyl-styrene, propyl-styrene, ethyl-methyl-styrene, ortho-chloro-styrene, para-chloro-styrene, divinyl benzenes such as para-divinyl benzene and vinyl naphthalene. Examples of copolymerizable materials include vinyl esters, such as vinyl chloride and vinyl acetate; esters of unsaturated acids such as methyl acrylate, methyl methacrylate and allyl cinnamate; unsaturated hydrocarbons and their halogen derivatives such as butadiene, isobutylene and chloroprene; aliphatic alpha-beta unsaturated acids, their anhydrides or esters such as maleic anhydride, diethyl maleate and diethyl fumarate; and other copolymerizable compounds containing ethylene double bonds such as tung oil and oiticia oil.

Usually the greatest advantages in copolymerizing mixtures of vinyl aromatic materials with other unsaturated compounds are obtained when at least 25% and, preferably, 50% of the polymerizable material is a vinyl aromatic compound.

The polymers obtained by the process of the invention are useful for the various purposes for which the products of prior processes have been employed, e. g., molding, coating, impregnating, etc. However, in view of the improved characteristics of the polymers made according to the present invention, they possess greater utility. In particular, the products of the process of the invention are especially suitable for molding purposes.

In place of polymerization in mass, the catalyst mixture of the invention may be used to polymerize vinyl aromatic compounds by other well known processes, e. g., the so-called solution suspension or emulsion process. In carrying out these processes, the usual techniques may be used which are well-known to those skilled in the art except for the employment of the catalyst mixture of the invention. Due to the diluting effect of the solvent or other polymerization medium it may be desirable in some cases to use somewhat larger amounts of catalyst. Thus, in the case of solution, suspension or emulsion polymerization, larger amounts of catalyst may be more frequently desirable, e. g., up to 5% based on the amount of polymerizable material.

It is obvious that many variations may be made in the products and processes of this invention without departing from the spirit and scope thereof as defined in the appended claims.

What is claimed is:

1. In the polymerization of a polymerizable material containing a vinyl aromatic compound, the step which comprises employing as a catalyst therefor a mixture of 5–95 parts of ditertiary butyl peroxide and 95–5 parts of tertiary butyl perbenzoate.

2. A process as defined in claim 1 in which the vinyl aromatic compound is a vinyl benzene.

3. A process as defined in claim 1 in which the polymerizable compound is styrene.

4. A process as defined in claim 3 in which the total amount of catalyst is 0.001–1% based on the styrene.

5. A process as defined in claim 4 in which the catalyst mixture contains not more than 75% of either component.

6. In the polymerization of styrene, the step which comprises employing 0.001–1%, based on the styrene, of a polymerization catalyst consisting of substantially equal amounts by weight of di (t-butyl) peroxide and t-butyl perbenzoate.

TEVIS SHUSMAN.

REFERENCES CITED

The following references are of record in the file of this patent:

UNITED STATES PATENTS

| Number | Name | Date |
|---|---|---|
| 2,420,911 | Roedel | May 20, 1947 |
| 2,426,476 | Vaughan et al. | Aug. 26, 1947 |

OTHER REFERENCES

Perry et al.: Properties and Uses of Some Novel Organic Peroxides, Union Bay State Chem. Co., publication (12 pp.), (recorded by Patent Office Jan. 20, 1948).